3,703,488
PROCESS FOR REUSE OF POLYESTER RESIN
Donald E. Morton, Edwardsville, Ill., assignor to The Goodyear Tire & Rubber Company, Akron, Ohio
No Drawing. Filed Mar. 22, 1968, Ser. No. 715,185
Int. Cl. C08g 53/22
U.S. Cl. 260—2.3            7 Claims

ABSTRACT OF THE DISCLOSURE

The invention is a method for depolymerizing polyester resin such as high molecular weight scrap by charging the resin with a small amount of a material selected from the group consisting of materials from which the polyester resin is derived into a worm extruder and extruding the mixture at a temperature of from 260 to 320° C. The high molecular weight resin is reduced in viscosity to a degree of polymerization in the range of from about 10 to about 40 and may be reused in the preparation of new resin.

---

This invention relates to the reuse of polymeric polyester resin materials. More particularly it relates to the conversion of already formed resin or scrap or waste polyester resin into low molecular weight material which can be polymerized into high molecular weight product suitable for use in the preparation of fibers, films, melt adhesives or other applications.

In the manufacture of high molecular weight polyester resins and the conversion of such materials into fiber and film or other products, waste material in the form of scraps of fibers or film or chunks of resin is produced. No process converts starting materials completely into final commercial form. Such waste or scrap constitutes a significant amount and results in a considerable economic loss if not reused in some form. There have been many proposals for the recovery of such waste material and particularly for the conversion of scrap polyethylene terephthalate into terephthalic acid or dimethyl terephthalate so that it can be reused to produce polymer. The conversion of scrap into terephthalic acid or dimethyl terephthalate can be accomplished but recovery by such conversion is costly and has not been entirely satisfactory.

The recovery of polyester resin by heating it with a large amount of glycol is shown in British Pat. 610,136. This process apparently reduces the polymer molecules to monomer and of course requires the recovery of the glycol.

It has now been found that the depolymerization of linear polyester resin can be rapidly accomplished using relatively small amounts of glycol or other reclaiming agent by a process in which the resin scrap is fed into a worm extrusion apparatus mixed with a minor amount of a material selected from the group consisting of water and materials from which the polyester is derived in a worm extruder and extruding the mixture from the extruder.

It is an object of the present invention to provide an economical process for the reuse of preformed polyester resin, particularly fiber and film scrap of high molecular weight polyester.

It is another object of the invention to provide a continuous process for the depolymerization of polyester resin scrap to low molecular weight polyester that can be converted to high molecular weight polyester by polymerization reaction.

It is another object of the invention to provide a process whereby a high molecular weight polyester resin can be converted into a low molecular weight polyester resin which can be modified by the inclusion of other acids or other glycols to produce new, different polyesters.

Other objects will become apparent from the following description of the invention.

The present invention is carried out by charging preformed polyester resin such as polyester film or fiber scrap and a small amount of a material from which the polyester is derived into a worm extrusion apparatus, subjecting the mixture to vigorous mixing and heating at a temperature of from about 260° C. to about 320° C. under pressure for a time sufficient to convert the mixture to low molecular weight polyester which is extruded from the apparatus and which can then be polymerized to form a high molecular weight resin. The condensation reaction is carried out by heating the mixture at a temperature of from about 260° C. to about 290° C. at a pressure of from about 0.5 to about 10 millimeters of mercury pressure in the presence of a suitable polymerization catalyst.

The following examples illustrate the invention.

EXAMPLE 1

Polyethylene terephthalate scrap having an intrinsic viscosity of 0.80 in the form of small chips was blended with 0.031 mol of ethylene glycol per mol of acid unit in the resin for 30 minutes. The thus "wetted" polyester was extruded through a one inch Killion Extruder maintained at 280° C. into a 500 milliliter reactor. The intrinsic viscosity of the extruded resin was 0.23. The pressure in the reactor was reduced to 0.5 millimeter of mercury and the temperature was regulated at 280° C. The 0.23 intrinsic viscosity polyester polymerized satisfactorily to highly polymeric polyester.

In carrying out the extrusion, a filter screen is generally used in the extruder to remove impurities and filterable solids from the molten low molecular weight resin. The reduction in intrinsic viscosity of the resin as it passes through the extruder so reduces the melt viscosity that filtration of the scrap through the screen is easier.

Example 1 shows reuse of the resin scrap by depolymerizing and then repolymerizing it to desired intrinsic viscosity. Generally the reclaimed scrap will be reused by mixing it in minor amounts with new resin prepolymer and polymerizing the mixture to the desired extent. This is illustrated in the following examples.

Samples of polyethylene terephthalate resin having the following characteristics were reworked by the process of the invention.

| Defective resin No. | Defect | I.V. | M.P., ° C. DTA [1] |
|---|---|---|---|
| 1 | Polymerization stopped before desired point. | 0.665 | 256 |
| 2 | Carbonized polymer | 0.774 | 256 |
| 3 | Contaminated | 0.765 | 255 |
| 4 | Degradation high | 0.774 | 256 |

[1] DTA is an abbreviation used for Differential Thermal Analysis.

The scrap resin after extrusion as in Example 1 using ethylene glycol as the reclaiming agent was reused by mixing it with new prepolymer and polymerizing the mixture with the results noted in the following table.

TABLE I.—CHEMICAL CHARACTERISTICS OF POLYESTER CONTAINING RECLAIMED POLYMER

| Example | Type | Reclaimed resin, percent of charge | Condensation time, minutes | M.P., ° C. DTA |
|---|---|---|---|---|
| 2 | Control | None | 105 | 256 |
| 3 | 1 | 10 | 110 | 256 |
| 4 | 1 | 15 | 108 | 256 |
| 5 | 1 | 20 | 117 | 256 |
| 6 | 2 | 20 | 115 | 255 |
| 7 | 2 | 10 | 124 | 256 |
| 8 | 3 | 10 | 129 | 255 |
| 9 | 3 | 20 | 101 | 255 |
| 10 | 4 | 15 | 119 | 256 |

In practice generally up to 20 percent of the reclaimed low molecular weight resin so formed from scrap or other off specification resin will be blended with new glycol esters or prepolymer. However, larger amounts can be blended if desired. In cases in which the low molecular weight recovered resin has high color it will be blended with new monomer or prepolymer in somewhat lower amounts so that the newly prepared high molecular weight resin will not have objectionable color.

The above examples illustrate the process using ethylene glycol as the reclaiming agent. Data in the following table illustrate the process reclaiming polyethylene terephthalate carried out using a dicarboxylic acid.

TABLE II

| Scrap I.V. | Acid used | Mols acid/ mol acid in scrap | I.V. of extruded product |
|---|---|---|---|
| 0.856 | Terephthalic acid | 0.031 | 0.146 |
| 0.856 | Isophthalic acid | 0.031 | 0.170 |
| 0.856 | Sebacic acid | 0.031 | 0.220 |

The low molecular weight polyester resin extrudate can be reused as described to prepare highly polymeric polyester resin.

While the process has been described with respect to the recovery of polymeric ethylene terephthalate polyester scrap it is applicable to the recovery of linear polyester scrap generally and to the preparation of polyester resins using a preformed resin as one of the starting materials. The process can be operated over a range of conditions and the resin reclaiming agent used can be water or a material from which the resins are derived such as various glycols and various acids. The temperature of the extruder will be in the range of from about 260° C. to about 320° C., preferably in the range of from 270° to 290° C. The pressure exerted by the extruder can be varied over a wide range. Usually the pressure used will be in the range of from 20 to 300 pounds per square inch gauge pressure. Those familiar with extrusion processes know that the pressure exerted can be varied using extruder screws in which the pitch of the flight of the screw is different as well as by varying the speed of rotation of the screw.

The average degree of polymerization of the low molecular weight poleyster produced will depend upon the ratio of the amount of preformed polyester or scrap used and the amount of recovering material charged into the extruder with the scrap. Generally the low molecular weight product produced will have an average degree of polymerization in the range of from about 10 to about 40 and preferably from about 20 to about 30. The polyester molecules have the general structure $H(GA)_nG-H$, where H is hydrogen, G is the glycol unit or residue after removal of H from the OH groups of the glycol, A is the dicarboxylic acid unit or residue after removal of the OH from the carboxy group, and $n$ is a number from about 10 to 40. The number average molecular weight of the low molecular weight polyester resin product depends on the molecular weights of the acids and glycols in the resin, as well as on the degree of polymerization of the polymer. Thus, when the low molecular weight polyester product is derived from ethylene glycol, terephthalic acid and/or isophthalic acid it will have a number average molecular weight of from about 2000 to about 8000. For such polyesters the degree of polymerization will be in the range of from 10 to 40. When such low molecular weight resin is polymerized either by batch process or continuous process in the presence of a polymerization catalyst to form a high polymer, the product is a highly polymeric linear polyester resin having an intrinsic viscosity of at least 0.30, generally in the range of from 0.50 to 1.20.

The preformed resin or scrap used will usually be high molecular weight resin having an intrinsic viscosity of 0.4 or higher. However, preformed resin having a lower intrinsic viscosity can be used if desired. Generally the resin is in the form of film, fibers, or chunks and is cut, chopped or ground to a size which can be readily mixed with reclaiming agent and can be conveniently fed into an extruder.

The amount of reclaiming agent used will vary according to the average molecular weight desired in the low molecular weight product and according to the ratio of resin to free acid used. It can be calculated using the following equation:

$$R = \frac{A}{n} + \frac{(n+1)}{(n)}$$

in which R is the number of mols of reclaiming agent required, A is the number of mols of dicarboxylic acid in the polymer scrap, and $n$ is the degree of polymerization desired in the low molecular weight product. Generally the amount of reclaiming agent used will be in the range of from 0.015 to 0.047 mol of reclaiming agent per mol of acid units in the polyester scrap used.

Residence time in the extrusion apparatus can be varied and will depend on the temperature of the barrel of the extruder, the length of the barrel, the screw angle and on the rate of rotation of the worm screw. Ordinarily the time required will be from one to three minutes and usually will be from one to two minutes, although somewhat longer times can be used, if desired.

The process can be operated continuously by continuously feeding resin to be recovered and reclaiming agent into the extruder and continuously extruding the low molecular weight product. High molecular weight polymer can be continuously prepared by continuously extruding the low molecular weight product into a continuous condensation apparatus where it is mixed with glycol esters or prepolymer and 0.03 part of a catalyst such as an antimony condensation catalyst and continuously condensed under reduced pressure at or below 10 millimeters of mercury pressure, generally below 1 millimeter of mercury pressure at a temperature in the range of from 260° to 290° C. for a time sufficient to produce polymer having an intrinsic viscosity of at least 0.4, with continuous removal of high molecular weight resin formed. If desired, the low molecular weight polyester can be continuously condensed to form high molecular weight polyester without the addition of fresh reactants.

The invention has been illustrated particularly with respect to using ethylene terephthalate polyester resin scrap. The process is applicable broadly to using any preformed linear polyester resin. Thus the resin used can be polyester resin derived from glycols and dicarboxylic acids, such as, for example, polyethyelne terephthalate, polycyclohexane dimethanol terephthalate, polyethylene adipate, polyethylene sebacate, polyethylene bibenzoate, ethylene terephthalate-ethylene isophthalate copolyester, ethylene terephthalate-ethylene adipate copolyester, ethylene terephthalate-ethylene sebacate copolyester, tetramethylene terephthalate and tetramethylene terephthalate-isophthalate.

Polyester resins, particularly those derived from glycols and dicarboxylic acids can be used. The resins may be aliphatic, aromatic or mixed aromatic aliphatic. They may contain only one recurring unit as in a homopolyester or they may contain several different units as in copolyesters of a dicarboxylic acid and a mixture of glycols or copolyesters of a mixture of acids with a single glycol or copolyesters of a mixture of acids with a mixture of glycols. Thus the polyester resins may be derived from one or more acids and one or more glycols.

Representative examples of dicarboxylic acids from which polyester resins can be derived and which can be used as reclaiming agent are: aromatic dicarboxylic acid; 2,8 naphthalene dicarboxylic acid; p,p′ bibenzoic acid; aliphatic dicarboxylic acids such as adipic acid, sebacic acid and azaleic acid.

Representative examples of glycols from which polyester resins can be derived and which can be used as reclaiming agent are ethylene glycol; propylene glycol; tetramethylene glycol; pentamethylene glycol; hexamethylene glycol; decamethylene glycol; 2,2 bis[4(β-hydroxyethoxy)phenyl] propane; cyclohexane dimethanol; substituted alkylene glycols such as 2-methyl propane diol 1,3; 2,2-dimethyl propane diol 1,3; 2-methyl-2-ethyl propane diol 1,3; and 2,2 diethyl propane diol 1,3.

In addition, the resins can be derived from lower alkyl and phenyl esters of the acids such as the methyl, ethyl, propyl and phenyl esters. These esters can also be used as reclaiming agents.

It is preferred to use reclaiming agents which are materials from which the resins are derived. Thus in the case of polyethylene terephthalate scrap, water, ethylene glycol, terephthalic acid and dimethyl terephthalate are preferred. In cases in which it is desired to modify the scrap, as for example to change a homopolyester to a copolyester, a different acid or glycol or mixture of these materials will be used.

The process of the invention can be used to prepare a resin that is identical in composition with the polyester resin being recovered by treating the scrap resin with reclaiming agents such as glycols and acids of the kind of which the resin is derived. A resin of different composition can be made by reacting the scrap resin with reclaiming agents such as glycols and acids that are different from those of which the resin is made. Resins having a composition different from that of the original resin can also be made by adding the low molecular weight polyester formed to a prepolymer prepared from a different acid and/or glycol and condensing the mixture to form a new resin or by mixing different acids and/or glycols with the low polymer and condensing the mixture to high molecular weight polymer. For example, to convert polyethylene terephthalate to a copolyester the resin can be converted to low molecular weight polyester according to the process of the invention and the low molecular weight polyester mixed with another glycol such as tetramethylene glycol or neopentyl glycol and terephthalic acid and the mixture condensed to form high molecular weight ethylene terephthalate-tetramethylene terephthalate or ethylene terephthalate-neopentyl terephthalate copolyester, according to the glycol used. Similarly, a copolyester of a different acid, such as isophthalic acid, can be prepared by adding such acid and condensing the mixture to form high molecular weight polyester.

No catalyst is needed in the production of the low molecular weight product although catalysts can be used if desired. A catalyst is generally used in the polymerization or condensation reaction. The condensation catalyst may suitably be a material such as antimony trioxide, zinc borate, litharge, lead acetate, magnesium oxide or other condensation catalyst. In addition, stabilizers such as phosphates, phosphites and calcium compounds can be added during the process without adverse effect on the polymerization reaction.

In this application intrinsic viscosity is defined as limit $\eta_r/C$ as C approaches 0 in which $\eta_2$ is the viscosity of a dilute solution of the resin in a 60:40 (weight ratio) mixture of phenol and tetrachloroethane divided by the viscosity of the solvent in the same unit at 30.0° C. and C is the concentration in grams of the copolyester per 100 cc. of solution.

While certain representative embodiments and details have been shown for the purpose of illustrating the invention it will be apparent to those skilled in this art that various changes and modifications may be made therein without departing from the spirit or scope of the invention.

What I claim is:

1. The method which comprises mixing high molecular weight linear polymeric polyester resin of a glycol and an organic dicarboxylic acid with from 0.015 to 0.047 mol of a reclaiming agent selected from the group consisting of organic materials from which said polyester is derived, per mol of dicarboxylic acid unit in the high molecular weight resin, at a temperature of from 260 to 320° C. at a pressure from about 20 to 300 pounds per square inch, the mixing being carried out under the action of a worm extruder for a period of from about one minute to three minutes or longer and extruding the mixture.

2. The process of claim 1 in which the reclaiming agent from which the resin is derived is selected from the group consisting of glycols, organic dicarboxylic acids and esters of organic dicarboxylic acids selected from low alkyl esters and phenyl esters.

3. The process of claim 1 in which the polyester resin is polyethylene terephthalate and the reclaiming agent used is selected from the group consisting of ethylene glycol, terephthalic acid and dimethyl terephthalate.

4. The process of claim 3 in which the reclaiming agent is ethylene glycol.

5. The process of claim 3 in which the high molecular weight polyethylene terephthalate is depolymerized to low molecular weight resin having an average degree of polymerization of from about 20 to 30.

6. The process of claim 4 in which the low molecular weight resin is added to newly formed resin prepolymer and condensed to high molecular weight polyester resin.

7. The process of claim 1 in which the high molecular weight linear polymeric polyester is a resin selected from the group consisting of polyethylene terephthalate, tetramethylene terephthalate, polycyclohexane dimethanol terephthalate and copolyesters of ethylene terephthalate-ethylene isophthalate, ethylene terephthalate-ethylene adipate, ethylene terephthalate-ethylene sebacate and tetramethylene terephthalate-tetramethylene isophthalate copolyester.

References Cited

UNITED STATES PATENTS

| | | | |
|---|---|---|---|
| 2,595,679 | 5/1952 | Lew | 260—75 |
| 3,098,046 | 7/1963 | Siggel et al. | 260—2.3 |
| 3,305,495 | 2/1967 | Vom Orde | 260—2.3 |
| 3,344,091 | 9/1967 | Russin et al. | 260—2.3 |
| 3,453,240 | 7/1969 | Plaster et al. | 260—2.3 |

FOREIGN PATENTS

| | | | |
|---|---|---|---|
| 21,932 | 1966 | Japan | 260—75 T |
| 463,566 | 3/1950 | Canada | 260—75 T |
| 527,546 | 7/1956 | Canada | 260—2.3 |
| 133,730 | 4/1947 | Australia | 260—75 T |
| 635,912 | 4/1950 | Great Britain | 260—2.3 |

SAMUEL H. BLECH, Primary Examiner

C. J. SECCURO, Assistant Examiner

U.S. Cl. X.R.

260—75 T